(12) United States Patent
Habermann et al.

(10) Patent No.: US 8,891,279 B2
(45) Date of Patent: Nov. 18, 2014

(54) ENHANCED WIRING STRUCTURE FOR A CACHE SUPPORTING AUXILIARY DATA OUTPUT

(71) Applicants: Christian Habermann, Boeblingen (DE); Walter Lipponer, Ammerbuch (DE); Martin Recktenwald, Schonaich (DE); Hans-Werner Tast, Schoenbuch (DE)

(72) Inventors: Christian Habermann, Boeblingen (DE); Walter Lipponer, Ammerbuch (DE); Martin Recktenwald, Schonaich (DE); Hans-Werner Tast, Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 13/621,328

(22) Filed: Sep. 17, 2012

(65) Prior Publication Data
US 2014/0082290 A1    Mar. 20, 2014

(51) Int. Cl.
*G11C 5/06* (2006.01)
(52) U.S. Cl.
USPC .......... 365/63; 365/69; 365/174; 365/189.02; 365/189.03; 365/189.17; 365/189.08
(58) Field of Classification Search
USPC .......... 365/63, 69, 174, 189.02, 189.03, 365/189.17, 189.08
See application file for complete search history.

(56) References Cited

U.S. PATENT DOCUMENTS

| 7,136,963 | B2* | 11/2006 | Ogawa et al. ........ 711/113 |
| 2,772,182 | A1 | 12/2009 | Hass |
| 7,865,669 | B2 | 1/2011 | Kornegay et al. |
| 7,986,543 | B2 | 7/2011 | Emma |
| 8,001,330 | B2 | 8/2011 | Clark et al. |
| 8,019,968 | B2 | 9/2011 | Luick |
| 8,667,368 | B2* | 3/2014 | Gupta et al. ........ 714/763 |
| 2003/0131183 | A1 | 7/2003 | Rappoport et al. |
| 2009/0006777 | A1 | 1/2009 | Donley et al. |
| 2009/0210632 | A1 | 8/2009 | Tsai et al. |
| 2012/0272006 | A1* | 10/2012 | Moyer ........ 711/125 |

OTHER PUBLICATIONS

Kumar, A. Ravi et al., "Design and Verification of Cache Memory Decoder for High Speed Multicore Processor", Third International Conference on Emerging Trends in Engineering and Technology, Nov. 19-21, 2010, 6 pages.

Warnock, J et al., "A 5.2 GHz Microprocessor Chip for the IBM zEnterprise System", Solid-State Circuits Conference Digest of Technical Papers (ISSCC), 2011 IEEE International, Feb. 20-24, 2011, pp. 70-72.

Zia, Aamir et al., "A 3-D Cache With Ultra-Wide Data Bus for 3-D Processor-Memory Integration", IEEE Transactions on Very Large Scale Integration (VLSI) Systems, vol. 18. No. 6. Jun. 2010, 11 pages.

* cited by examiner

*Primary Examiner* — Fernando Hidalgo
(74) *Attorney, Agent, or Firm* — Stephen R. Tkacs; Stephen J. Walder, Jr.; Thomas E. Tyson (57) ABSTRACT

A mechanism is provided in a data processing system for enhancing wiring structure for a cache supporting an auxiliary data output. The mechanism splits the data cache into a first data portion and a second data portion. The first data portion provides a first set of data elements and the second data portion provides a second set of data elements. The mechanism connects a first data path to provide the first set of data elements to a primary output and connects a second data path to provide the second set of data elements to the primary output. The mechanism feeds the first data path back into the second data path and feeds the second data path back into the first data path. The mechanism connects a secondary output to the second data path.

20 Claims, 4 Drawing Sheets

ENHANCED WIRING STRUCTURE FOR A CACHE SUPPORTING AUXILIARY DATA OUTPUT

BACKGROUND

The present application relates generally to an improved data processing apparatus and method and more specifically to mechanisms for enhanced wiring structure for a cache supporting auxiliary data output.

Two of the key performance metrics of cache design are fetch bandwidth and access latency. Optimally, all data that can be read from the cache arrays with one access would be transferred in one cycle into the next lower cache hierarchy, such as from an L2 cache to an L1 cache. Due to physical limitations, a common design point is to arrange the data arrays in logical, and often actual physical, "rows" and transfer only as many rows in one "data shot" as routing and cycle time constraints allow.

A major contributor to fetch bandwidth is the width of the fetch return data bus. To minimize latency, the wires used for these data busses often have to be high performance wires. In a given microprocessor technology, there is a limited amount of wire available, particularly for high performance wires.

Many cache designs have more than one consumer of data reads from the cache. A common case is a store-through design where background data is read from the cache arrays to form valid stores for the next higher cache level. Other cases may include array test logic or co-processors attached as separate consumers. The wiring resources must be shared between all of these data consumers.

Often, particularly in a microprocessor core, one of the consumers is a "most important" or primary consumer. The primary consumer should get as much of the resources as possible. This would be the case for a L2 cache data return path to an L1 cache vs. the L2 cache's store path to the L3 cache. Still, performance for these secondary consumers is an important design point.

SUMMARY

In one illustrative embodiment, a method, in a data processing system, is provided for enhancing wiring structure for a cache supporting an auxiliary data output. The method comprises splitting the data cache into a first data portion and a second data portion. The first data portion provides a first set of data elements and the second data portion provides a second set of data elements. The method further comprises connecting a first data path to provide the first set of data elements to a primary output and connecting a second data path to provide the second set of data elements to the primary output. The method further comprises feeding the first data path back into the second data path and feeding the second data path back into the first data path. The method further comprises connecting a secondary output to the second data path such that a first subset of the first set of data elements and a first subset of the second set of data elements are provided to the secondary output in a first configuration and a second subset of the first set of data elements and a second subset of the second set of data elements are provided to the secondary output in a second configuration.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for presenting an optimized cache data flow structure that maximizes the amount of wire available for fetch data, return while still maintaining a very high bandwidth secondary data bus, e.g., very high store bandwidth. The mechanism makes best use of the wires that are already there for the main data flow. The mechanism splits the fetch return data flow into two logically separated parts and feeds back the main data return path of each data flow into the data flow of the other part. The mechanism selects only one of the data flows at an appropriate physical location as a secondary cache output. Most of the additional wiring required for the auxiliary data bus is kept local (short distance).

Comparing to existing solutions that use only half of the wires for the auxiliary datapath, the main advantage of the mechanism of the illustrative embodiments is that no additional multiplexing and no additional latches are required to store/select only a part of the main data flow outputs to be delivered to the auxiliary data bus.

Figure 1:
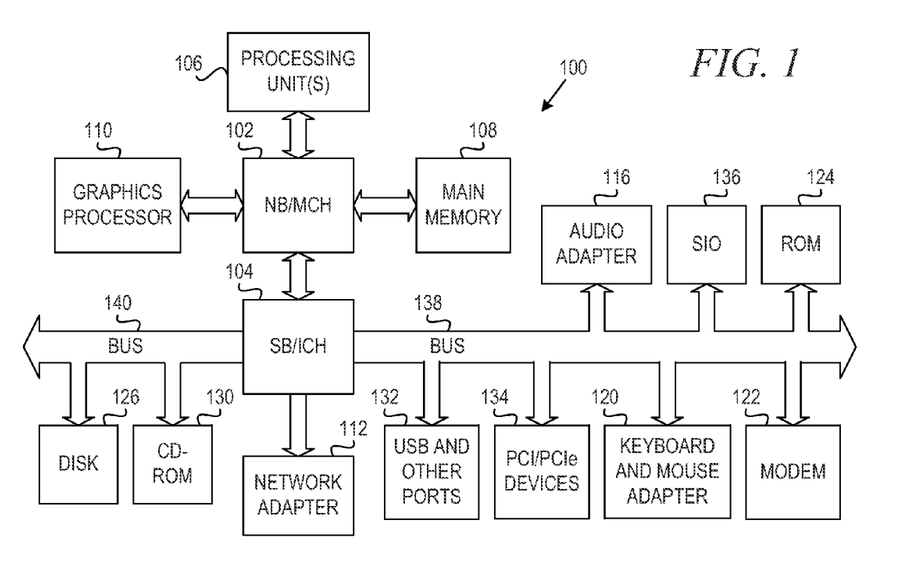
FIG. 1 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 100 (Java is a trademark of Oracle and/or its affiliates.).

As a server, data processing system 100 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
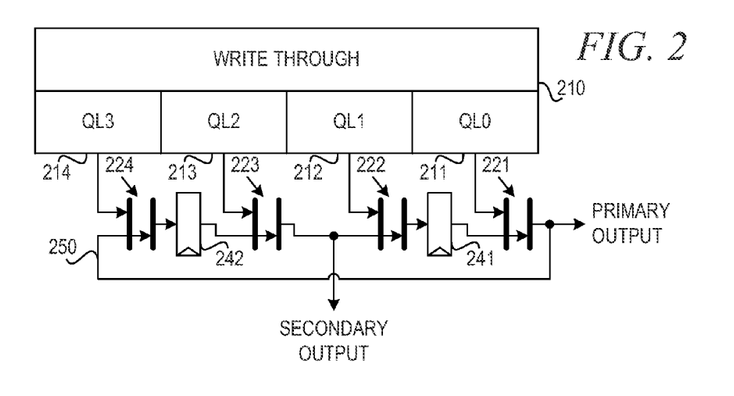
FIG. 2 is a block diagram of an example write through cache wiring in which aspects of the invention may be implemented.

FIG. 2 is a block diagram of an example write through cache wiring in which aspects of the invention may be implemented. Write through cache 210 comprises word QL0 211, word QL1 212, word QL2 213, and word QL3 214. Multiplexer 221 receives word QL0 211 at a first input and the output of latch 241 at a second input. Multiplexer 221 provides the primary output. In the case of an L1 cache, the primary output may be to the load/store unit (LSU). In the case of an L2 cache, the primary output may be to the L1 cache.

Multiplexer 222 receives word QL1 212 at a first input and the output of multiplexer 223 at a second input. Multiplexer 222 provides its output to latch 241. Multiplexer 223 receives word QL2 213 at a first input and the output of latch 242 at a second input, and provides its output to multiplexer 222. Multiplexer 224 receives word QL3 214 at a first input and the output of multiplexer 221, via feedback loop 250, at a second input. Multiplexer 224 provides its output to latch 242.

Depending on the settings of multiplexers 222, 223, 224, latch 241 either stores word QL1 212 or words QL2 213 and QL3 214. Thus, in a first setting, multiplexer 221 may provide word QL0 211 to the primary output in a first cycle and then word QL1 212, via latch 241, to the primary output in a second cycle. In a second setting, multiplexer 221 may provide word QL2 213, via latch 241, to the primary output in a first cycle. Then, word QL3 214 may shift from latch 242 to latch 241 and be provided to the primary output in a second cycle.

Multiplexer 223 also provides its output to a secondary output. In a first setting, multiplexer 223 may provide word QL2 213 to the secondary output in a first cycle and then word QL3 214, via latch 242, to the secondary output in a second cycle. In a second setting, multiplexer 223 may provide word QL0 211, via feedback loop 250 and latch 242, to the secondary output in a first cycle. Then, word QL1 212 may shift from latch 241 to latch 242 and be provided to the secondary output in a second cycle.

Figure 3:
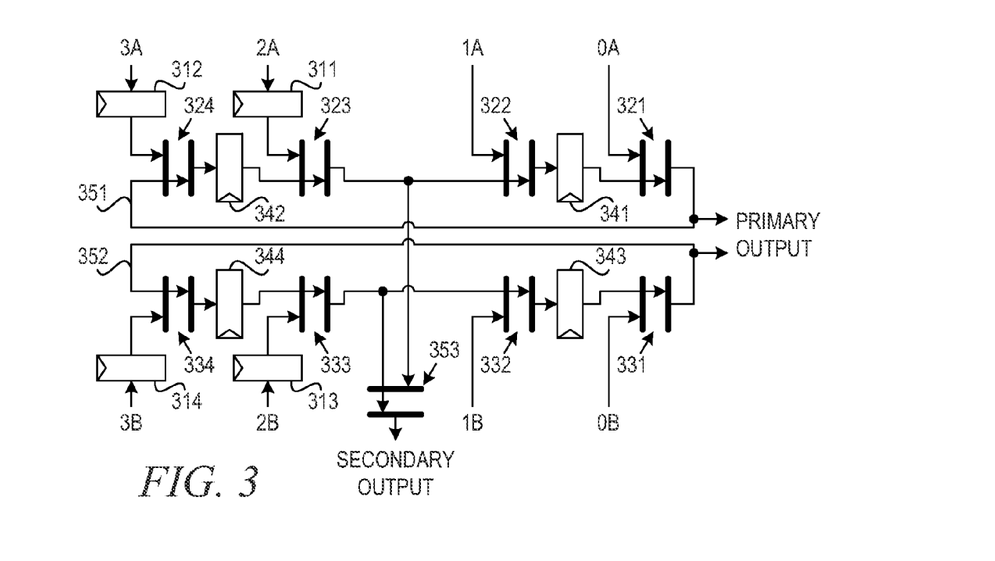
FIG. 3 is a block diagram of an example write through cache wiring with rows split into a first set of data elements and a second set of data elements in which aspects of the invention may be implemented.

FIG. 3 is a block diagram of an example write through cache wiring with rows split into a first set of data elements and a second set of data elements in which aspects of the invention may be implemented. The data in the cache array rows is logically split into two equal-sized parts. For example, if a row delivers two words of data, the split will result in two portions, each being a data word. Thus, row 0 results in word 0A and word 0B; row 1 results in word 1A and word 1B; row 2 results in word 2A and word 2B; and, word 3 results in word 3A and word 3B.

In a first portion of the split, multiplexer 321 receives word 0A at a first input and the output of latch 341 at a second input. Multiplexer 321 provides a first portion of the primary output. Multiplexer 322 receives word 1A at a first input and the output of multiplexer 323 at a second input. Multiplexer 322 provides its output to latch 341. Multiplexer 323 receives word 2A, via latch 311, at a first input and the output of latch 342 at a second input, and provides its output to multiplexer 322. Multiplexer 324 receives word 3A, via latch 312, at a first input and the output of multiplexer 321, via feedback loop 351, at a second input. Multiplexer 324 provides its output to latch 342.

In a second portion of the split, multiplexer 331 receives word 0B at a first input and the output of latch 343 at a second input. Multiplexer 331 provides a second portion of the primary output. Multiplexer 332 receives word 1B at a first input and the output of multiplexer 333 at a second input. Multiplexer 332 provides its output to latch 343. Multiplexer 333 receives word 213, via latch 313, at a first input and the output of latch 344 at a second input, and provides its output to multiplexer 332. Multiplexer 334 receives word 3B, via latch 314, at a first input and the output of multiplexer 331, via feedback loop 352, at a second input. Multiplexer 334 provides its output to latch 344.

Depending on the settings of multiplexers 322, 323, 324, 332, 333, 334, latches 341, 343 either store words 1A, 1B or words 2A/2B and 3A/3B. Thus, in a first setting, multiplexers 321, 331 may provide words 0A/0B to the primary output in a first cycle and then words 1A/1B, via latches 341, 343, to the primary output in a second cycle. Concurrently, in the first cycle, latches 311, 313 store words 2A/2B, and latches 312/314 store words 3A/3B. In the second cycle, latch 342 stores word 3A, latch 341 stores word 2A, and latch 344 stores word 3B, latch 343 stores word 2B. Then in a third cycle, latches 341/343 provide words 2A/2B to the primary output, and at the same time are loaded with words 3A/3B. In the fourth cycle, latches 341/343 finally provide words 3A/3B to the primary output. So the primary output receives a sequence of words 0A/0B, 1A/1B, 2A/2B, 3A/3B in four succeeding cycles.

The base assumption for this structure is that all words 0A, 1A, 2A, 3A, 0B, 1B, 2B, 3B are available in the same cycle. Latches 311, 312, 313, 314 symbolize a one-cycle delay for accessing data from 2A/2B/3A/3B (e.g., due to physical distance, the actual cache arrays delivering that data would be clocked one cycle later than the cache arrays sourcing 0A/0B/1A/1B).

Multiplexers 323, 333 also provide output to a secondary output. In a first setting, multiplexers 323, 333 may provide words 2A/2B to the secondary output in a first cycle and then words 3A/3B, via latches 342, 344, to the secondary output in a second cycle. In a second setting, multiplexers 323, 333 may provide words 0A/0B, via feedback loops 351, 352 and latches 342, 344, to the secondary output in a first cycle. Then, words 1A/1B may shift from latches 341, 343 to latches 342, 344 and be provided to the secondary output in a second cycle.

The primary output provides full rows of output. Multiplexer 353 selects between the first portion of the split and the second portion of the split, thus providing half-rows to the secondary output.

The data split could be between the first word and the second word. In an alternative embodiment, the data split could be between even bits and odd bits. This would be physically preferable assuming an implementation where bits are placed next to each other based on their natural ordering. But the consumer of the data most likely expects a continuous word instead of half the bits from one word and half the bits from another word.

Alternatively, the two words can be physically interleaved in the cache data flow. For example, this could be a bit-interleave or a byte interleave, anything that is within reasonable physical distance such that wiring delays getting from one bit of one part to the matching bit of the other part are small relative to the cycle time.

Figure 4A:
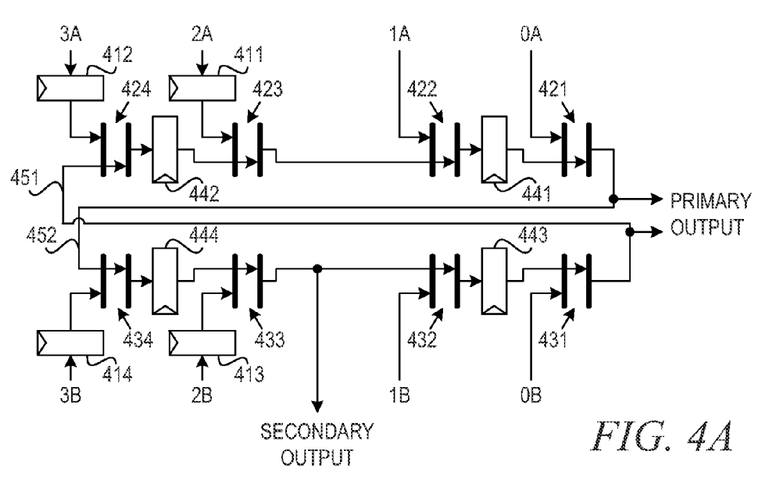
FIGS. 4A and 4B depict block diagrams of an example write through cache wiring with four split rows in accordance with art illustrative embodiment.
Figure 4B:
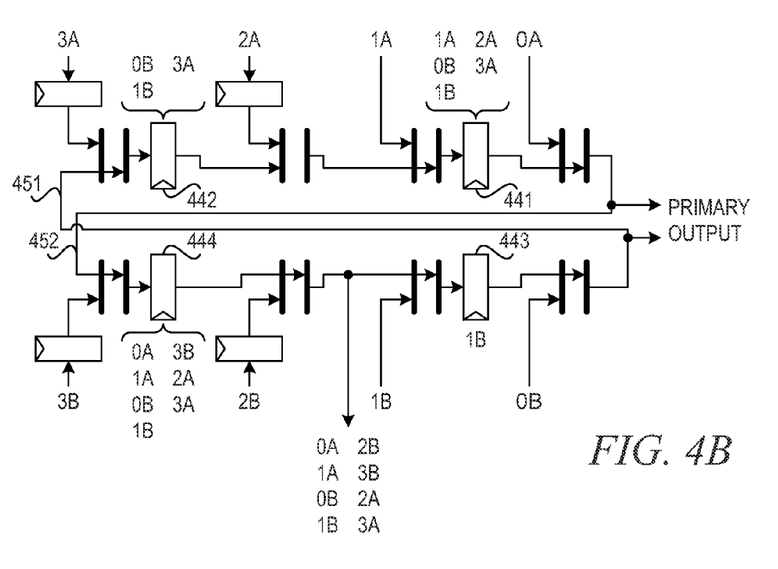

FIGS. 4A and 4B depict block diagrams of an example write through cache wiring with split rows in accordance with an illustrative embodiment. With reference to FIG. 4A, the data in the cache array rows is logically split into two equal-sized parts. For example, if a row delivers two words of data, the split will result in two portions, each being a data word. Thus, row 0 results in word 0A and word 0B; row 1 results in word 1A and word 1B; row 2 results in word 2A and word 2B; and, word 3 results in word 3A and word 3B.

In a first portion of the split, multiplexer 421 receives word 0A at a first input and the output of latch 441 at a second input. Multiplexer 421 provides a first portion of the primary output. Multiplexer 422 receives word 1A at a first input and the output of multiplexer 423 at a second input. Multiplexer 422 provides its output to latch 441. Multiplexer 423 receives word 2A, via latch 411, at a first input and the output of latch 442 at a second input, and provides its output to multiplexer 422. Multiplexer 424 receives word 3A, via latch 412, at a first input and the output of multiplexer 431, via feedback loop 451, at a second input. Multiplexer 424 provides its output to latch 442.

In a second portion of the split, multiplexer 431 receives word 0B at a first input and the output of latch 443 at a second input. Multiplexer 431 provides a second portion of the primary output. Multiplexer 432 receives word 1B at a first input and the output of multiplexer 433 at a second input. Multiplexer 432 provides its output to latch 443. Multiplexer 433 receives word 2B, via latch 413, at a first input and the output of latch 444 at a second input, and provides its output to multiplexer 432. Multiplexer 434 receives word 3B, via latch 414, at a first input and the output of multiplexer 421, via feedback loop 452, at a second input. Multiplexer 434 provides its output to latch 444.

Depending on the settings of multiplexers 422, 423, 424, 432, 433, 434, latches 441, 443 either store words 1A, 1B or words 2A/2B and 3A/3B. Thus, in a first setting, multiplexers 421, 431 may provide words 0A/0B to the primary output in a first cycle and then words 1A/1B, via latches 441, 443, to the primary output in a second cycle. Concurrently, in the first cycle, latches 411, 413 store words 2A/2B and latches 412/414 store words 3A/3B. In the second cycle, latch 442 stores word 3A, latch 441 stores word 2A, and latch 444 stores word 3B, latch 443 stores word 2B. Then in a third cycle, latches 441/443 provide words 2A/2B to the primary output, and at the same time are loaded with words 3A/3B. In the fourth cycle, latches 441/443 finally provide words 3A/3B to the primary output. So the primary output receives a sequence of words 0A/0B, 1A/1B, 2A/2B, 3A/3B in four succeeding cycles.

Multiplexer 433 also provides output to a secondary output. Turning to FIG. 4B, latch 443 may store word 1B. Latch 442 may store word 0B and then word 1B in a first setting or store word 3A in a second setting. Latch 441 may store word 1A, word 0B, and then word 1B in a first setting or may store word 2A and then word 3A in a second setting. Latch 444 may store word 0A, word 1A, word 0B, and then word 1B in a first setting, and then store word 3B, word 2A, and then word 3A in a second setting. Finally, the secondary output may provide word 0A, word 1A, word 0B, and then word 1B in a first setting or may provide word 2B, word 3B, word 2A, and then word 3A in a second setting.

The flow of data through the cache to the secondary output is logically split into parts defined by the data split. In the above example, this means there is a logical flow for words 0 and 1 and another flow for words 2 and 3. The output to the next lower-level cache hierarchy, i.e., the primary output data path, essentially ignores the split and provides the maximum bandwidth. In parallel to this output, the secondary output transfers the data read from the cache and feeds it back into the data flow of the other words. Thus, data arriving at the word 0 output of the cache is fed back into the data flow of word 3 in both sides of the data split.

The secondary output data bus requires only one bus that runs for a significant length, from the top of the cache area to the place where it feeds back into the other data flow (from the right to the left in FIG. 4A/4B), and that bus is only half the width of the primary output data return bus. The resulting structure is a loop that resembles a "horizontal 8." The secondary output selects either data from rows 0 and 1 or data from rows 2 and 3. If the secondary output selects data from rows 0 and 1, the resulting output is as follows: word 0A, word 1A, word 0B, word 1B. If the secondary output selects data from rows 2 and 3, the resulting output is as follows: word 2B, word 3B, word 2A, word 3A. It should be noted that both sequences actually deliver the data in the same cycles relative to the start of a cache access: The row0/row1 case has one additional staging latch on its way to the output, but it is clocked one cycle earlier than row2/row3. In an alternative embodiment, latches 411, 412, 413, 414 may be removed, and data words 2A, 2B, 3A, and 3B may be accessed a cycle later.

The secondary output may be taken from an arbitrary place in the loop. The place shown in FIGS. 4A and 4B is chosen assuming a common data flow where write-through data (as store data) has to be delivered to the next-higher level cache, and that is commonly located on the opposite side of the next lower-level cache. The cache data array words may be rearranged so those being multiplexed are right next to each other for shorter wires. Furthermore, placing a multiplexer right next to a latch feeding an input involves only local wires.

While the example depicted in FIGS. 4A and 4B show a four row cache, the aspects of the illustrative embodiments may be applied to caches with fewer or more rows. For example, the aspects of the illustrative embodiments may be applied to a two-row cache.

Figure 5:
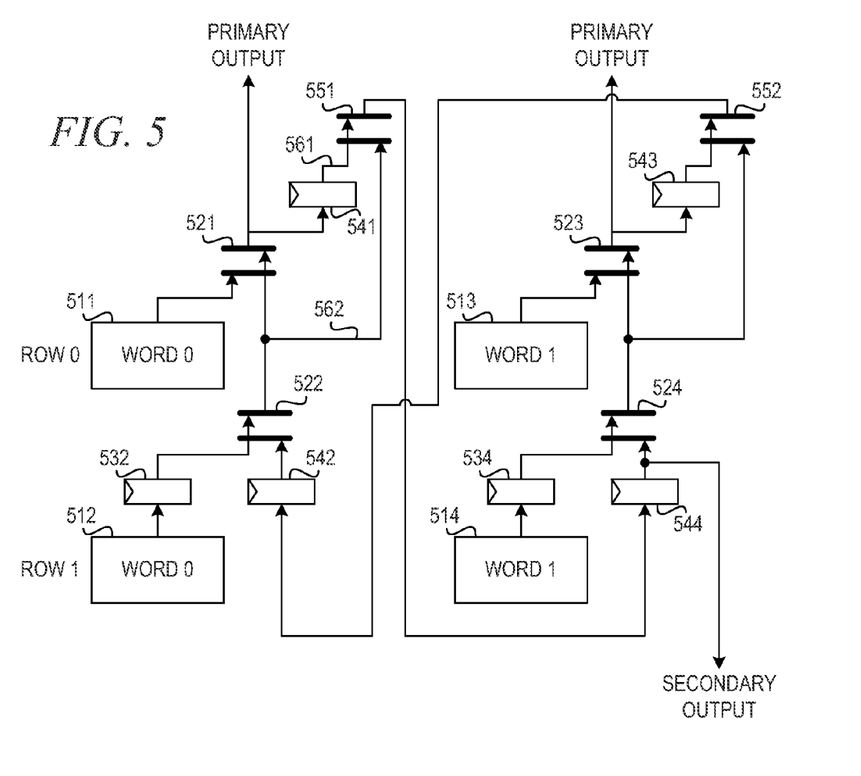
FIG. 5 depicts a block diagram of an example two row cache wiring with split rows in accordance with an illustrative embodiment.

FIG. 5 depicts a block diagram of an example two row cache wiring with split rows in accordance with an illustrative embodiment. The cache has two rows: row 0 and row 1. Row 0 has word 0 511 and word 1 513. Row 1 has word 0 512 and word 1 514. Multiplexer 521 receives data from row 0, word 0 511 as a first input and provides output to the primary output. Multiplexer 522 receives data from row 1, word 0 512, via latch 532, at a first input and provides output to a second input of multiplexer 521.

Multiplexer 523 receives data from row 0, word 1 513 as a first input and provides output to the primary output. Multiplexer 524 receives data from row 1, word 1 514, via latch 534, at a first input and provides output to a second input of multiplexer 523.

Latch 541 receives the output of multiplexer 521. Multiplexer 551 receives the output of latch 541 as a first input and the output of multiplexer 521 as a second input. Multiplexer 551 provides a feedback loop to latch 544, which provides output to a second input of multiplexer 524. Latch 543 receives the output of multiplexer 523. Multiplexer 552 receives the output of latch 543 as a first input and the output of multiplexer 524 as a second input. Multiplexer 552 provides a feedback loop to latch 542, which provides output to a second input of multiplexer 522.

Both rows are clocked in the same cycle. The data is transferred to the next lower level cache in two cycles. The first cycle sends word 0 and word 1 of row 0, and the second cycle sends word 0 and word 1 of row 1. With the wiring and stating structure shown in FIG. 5, the half-bandwidth secondary output delivers data in the following order: row 0 word 0, row 0 word 1; or, row 1 word 0, row 1 word 1.

Note that multiplexer 551 is drawn at its place only for easier understanding. Physically, multiplexer 551 may be placed right below latch 542. This still means that only one of the busses 561, 562 has to be wired across half the cache height. Bus 562 is sourced at multiplexer 522, which is physically next to latch 542. With the multiplexer being placed next to latch 542, this is again only local wiring.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
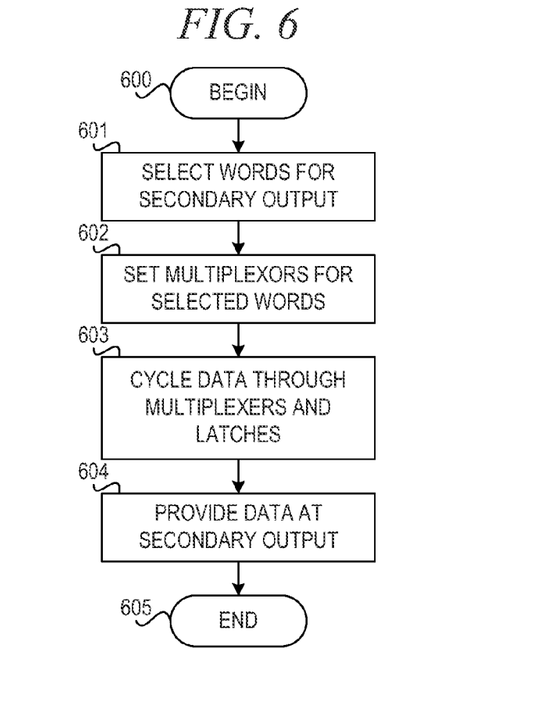
FIG. 6 is a flowchart illustrating operation of a cache with split rows and secondary output in accordance with an illustrative embodiment.

FIG. 6 is a flowchart illustrating operation of a cache with split rows and secondary output in accordance with an illustrative embodiment. Operation begins (block 600), and the cache controller selects words for the secondary output (block 601). In the example shown in FIGS. 4A and 4B, the cache controller may select to provide rows 0 and 1 to the secondary output or may select to provide rows 2 and 3 to the secondary output. The cache controller then sets the multiplexers for the selected data words to output (block 602) and cycles data through the multiplexers and latches (block 603). The cache controller then provides the data words at the secondary output (block 604). Thereafter, operation ends (block 605).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for enhanced wiring structure for a cache supporting an auxiliary data output. The mechanisms of the illustrative embodiments maximize the amount of wire available for fetch data return while still maintaining a very high bandwidth secondary data bus (e.g., providing very high store bandwidth). The illustrative embodiments make best use of the wires that are already there for the main data flow. This is achieved by splitting the fetch return data flow into two logically separate parts and feeding back the main data return path of each data flow into the data flow of the other part. At an appropriate physical location, only one of the data flows is selected as a secondary cache output. The illustrative embodiments require no additional multiplexing and no additional latches to store/select only a part of the main data flow outputs to be delivered to the auxiliary data bus.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for enhancing wiring structure for a cache supporting an auxiliary data output, the method comprising:
    splitting the data cache into a first data portion and a second data portion, wherein the first data portion provides a first set of data elements and the second data portion provides a second set of data elements;
    connecting a first data path to provide the first set of data elements to a primary output;
    connecting a second data path to provide the second set of data elements to the primary output;
    feeding the first data path back into the second data path and feeding the second data path back into the first data path; and
    connecting a secondary output to the second data path such that a first subset of the first set of data elements and a first subset of the second set of data elements are provided to the secondary output in a first configuration and a second subset of the first set of data elements and a second subset of the second set of data elements are provided to the secondary output in a second configuration.

2. The method of claim 1, wherein the data cache comprises a plurality of rows, wherein the first data portion comprises a first word of each of the plurality of rows, and wherein the second data portion comprises a second word of each of the plurality of rows.

3. The method of claim 2, wherein connecting a first data path to provide the first set of data elements to a primary output comprises:
    connecting a first input of a first multiplexer to a first word of a first row within the plurality of rows and a first input of a second multiplexer to a first word of a second row within the plurality of rows;
    connecting an output of the second multiplexer to a second input of the first multiplexer; and
    providing an output of the first multiplexer as a first primary output;
    wherein connecting the second data path to provide the second set of data elements to the primary output comprises:
        connecting a first input of a third multiplexer to a second word of the first row within the plurality of rows and a first input of a fourth multiplexer to a second word of the second row within the plurality of rows;
        connecting an output of the fourth multiplexer to a second input of the third multiplexer; and
        providing an output of the third multiplexer as a second primary output, wherein the first primary output and the second primary output comprise a high bandwidth primary output.

4. The method of claim 3, wherein connecting the first input of the second multiplexer to the first word of the second row comprises storing the first word of the second row in a first latch and connecting an output of the first latch to the first input of the second multiplexer and wherein connecting the first input of the fourth multiplexer to the second word of the second row comprises storing the second word of the second row in a second latch and connecting an output of the second latch to the first input of the second multiplexer.

5. The method of claim 3, wherein feeding the first data path back into the second data path comprises:
    storing an output of the first multiplexer in a third latch;
    connecting an output of the third latch to a first input of a first feedback multiplexer;
    connecting an output of the second multiplexer to a second input of the first feedback multiplexer;
    storing an output of the first feedback multiplexer in a first feedback latch; and
    connecting an output of the first feedback latch to a second input of the fourth multiplexer.

6. The method of claim 5, wherein connecting a secondary output to the second data path comprises connecting the secondary output to the output of the first feedback latch.

7. The method of claim 3, wherein feeding the second data path back into the first data path comprises:
    storing an output of the third multiplexer in a fourth latch;
    connecting an output of the fourth latch to a first input of a second feedback multiplexer;
    connecting an output of the fourth multiplexer to a second input of the second feedback multiplexer;
    storing an output of the second feedback multiplexer in a second feedback latch; and
    connecting an output of the second feedback latch to a second input of the second multiplexer.

8. The method of claim 2, wherein connecting a first data path to provide the first set of data elements to a primary output comprises:
    connecting a first word of a first row within the plurality of rows to a first input of a first multiplexer;
    connecting a first word of a second row within the plurality of rows to a first input of a second multiplexer;
    connecting an output of the second multiplexer to an input of a first latch;
    connecting an output of the first latch to a second input of the first multiplexer;
    connecting a first word of a third row within the plurality of rows to a first input of a third multiplexer;
    connecting a first word of a fourth row within the plurality of rows to a first input of a fourth multiplexer;
    connecting an output of the fourth multiplexer to an input of a second latch;
    connecting an output of the second latch to a second input of the third multiplexer;
    connecting an output of the third multiplexer to a second input of the second multiplexer; and
    providing an output of the first multiplexer as a first primary output;
    wherein connecting the second data path to provide the second set of data elements to the primary output comprises:
        connecting a second word of the first row to a first input of a fifth multiplexer;

connecting a second word of the second row to a first input of a sixth multiplexer;
connecting an output of the sixth multiplexer to an input of a third latch;
connecting an output of the third latch to a second input of the fifth multiplexer;
connecting a second word of the third row to a first input of a seventh multiplexer;
connecting a second word of the fourth row to a first input of an eighth multiplexer;
connecting an output of the eighth multiplexer to an input of a fourth latch;
connecting an output of the fourth latch to a second input of the seventh multiplexer;
connecting an output of the seventh multiplexer to a second input of the sixth multiplexer; and
providing an output of the fifth multiplexer as a second primary output, wherein the first primary output and the second primary output comprise a high bandwidth primary output.

9. The method of claim 8, wherein feeding the first data path back into the second data path comprises connecting the output of the first multiplexer to a second input of the eighth multiplexer and wherein feeding the second data path back into the first data path comprises connecting the output of the fifth multiplexer to a second input of the fourth multiplexer.

10. The method of claim 9, wherein connecting a secondary output to the second data path comprises connecting the secondary output to the output of the seventh multiplexer.

11. The method of claim 10, further comprising:
setting the first, second, third, fourth, fifth, sixth, seventh, and eighth multiplexers to provide the first row and second row to the secondary output.

12. The method of claim 10, further comprising:
setting the first, second, third, fourth, fifth, sixth, seventh, and eighth multiplexers to provide the third row and fourth row to the secondary output.

13. A wiring structure for a cache supporting an auxiliary data output, comprising:
a data cache split into a first data portion and a second data portion, wherein the first data portion provides a first set of data elements and the second data portion provides a second set of data elements;
a first data path connected to provide the first set of data elements to a primary output;
a second data path connected to provide the second set of data elements to the primary output, wherein the first data path is fed back into the second data path and the second data path is fed back into the first data path; and
a secondary output connected to the second data path such that a first subset of the first set of data elements and a first subset of the second set of data elements are provided to the secondary output in a first configuration and a second subset of the first set of data elements and a second subset of the second set of data elements are provided to the secondary output in a second configuration.

14. The wiring structure of claim 13, wherein the data cache comprises a plurality of rows, wherein the first data portion comprises a first word of each of the plurality of rows, and wherein the second data portion comprises a second word of each of the plurality of rows.

15. The wiring structure of claim 14, wherein the first data path is connected to provide the first set of data elements to a primary output such that a first input of a first multiplexer is connected to a first word of a first row within the plurality of rows and a first input of a second multiplexer is connected to a first word of a second row within the plurality of rows, an output of the second multiplexer is connected to a second input of the first multiplexer, and an output of the first multiplexer is provided as a first primary output; and
wherein the second data path is connected to provide the second set of data elements to the primary output such that a first input of a third multiplexer is connected to a second word of the first row within the plurality of rows and a first input of a fourth multiplexer is connected to a second word of the second row within the plurality of rows, an output of the fourth multiplexer is connected to a second input of the third multiplexer, and an output of the third multiplexer is provided as a second primary output, wherein the first primary output and the second primary output comprise a high bandwidth primary output.

16. The wiring structure of claim 15, wherein the first input of the second multiplexer is connected to the first word of the second row such that the first word of the second row is stored in a first latch and an output of the first latch is connected to the first input of the second multiplexer; and
wherein the first input of the fourth multiplexer is connected to the second word of the second row such that the second word of the second row is stored in a second latch and an output of the second latch is connected to the first input of the second multiplexer.

17. The wiring structure of claim 15, wherein the first data path is bed back into the second data path such that an output of the first multiplexer is stored in a third latch, an output of the third latch is connected to a first input of a first feedback multiplexer, an output of the second multiplexer is connected to a second input of the first feedback multiplexer, an output of the first feedback multiplexer is stored in a first feedback latch, and an output of the first feedback latch is connected to a second input of the fourth multiplexer.

18. The wiring structure of claim 17, wherein the secondary output is connected to the output of the first feedback latch.

19. The wiring structure of claim 14, wherein the first data path is connected to provide the first set of data elements to a primary output such that a first word of a first row within the plurality of rows is connected to a first input of a first multiplexer, a first word of a second row within the plurality of rows is connected to a first input of a second multiplexer, an output of the second multiplexer is connected to an input of a first latch, an output of the first latch is connected to a second input of the first multiplexer, a first word of a third row within the plurality of rows is connected to a first input of a third multiplexer, a first word of a fourth row within the plurality of rows is connected to a first input of a fourth multiplexer, an output of the fourth multiplexer is connected to an input of a second latch, an output of the second latch is connected to a second input of the third multiplexer, an output of the third multiplexer is connected to a second input of the second multiplexer, and an output of the first multiplexer is provided as a first primary output; and
wherein the second data path is connected to provide the second set of data elements to the primary output such that a second word of the first row is connected to a first input of a fifth multiplexer, a second word of the second row is connected to a first input of a sixth multiplexer, an output of the sixth multiplexer is connected to an input of a third latch, an output of the third latch is connected to a second input of the fifth multiplexer, a second word of the third row is connected to a first input of a seventh multiplexer, a second word of the fourth row is connected to a first input of an eighth multiplexer, an output of the eighth multiplexer is connected to an input of a fourth latch, an output of the fourth latch is connected to a second input of the seventh multiplexer, an output of the seventh multiplexer is connected to a second input of the sixth multiplexer, and an output of the fifth multiplexer is provided as a second primary output, wherein the first primary output and the second primary output comprise a high bandwidth primary output.

20. The wiring structure of claim 19, wherein the first data path us fed back into the second data path such that the output of the first multiplexer is connected to a second input of the eighth multiplexer;

wherein the second data path is fed back into the first data path such that the output of the fifth multiplexer is connected to a second input of the fourth multiplexer; and wherein the secondary output is connected to the output of the seventh multiplexer.

* * * * *